UNITED STATES PATENT OFFICE.

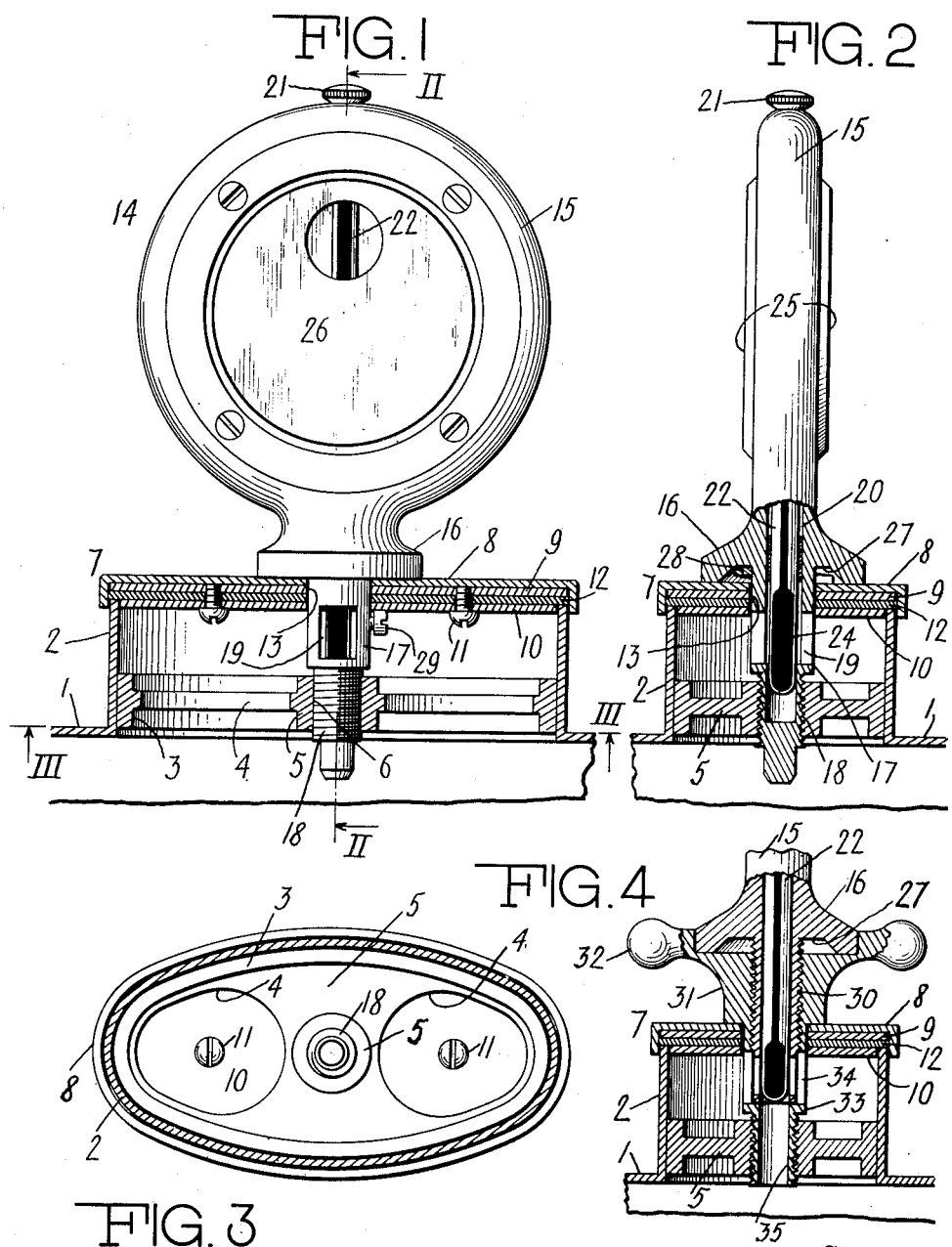

HARRISON H. BOYCE, OF FOREST HILLS, NEW YORK.

TEMPERATURE-INDICATING INSTRUMENT FOR AUTOMOBILE ENGINES.

1,408,259.  Specification of Letters Patent.  Patented Feb. 28, 1922.

Application filed July 25, 1916. Serial No. 111,110.

*To all whom it may concern:*

Be it known that I, HARRISON H. BOYCE, a citizen of the United States, residing at Forest Hills, in the county of Queens, city and State of New York, have invented certain new and useful Improvements in Temperature-Indicating Instruments for Automobile Engines, of which the following is a specification.

This invention relates to improvements in temperature indicating devices for automobile engines, and particularly to the application of such devices to the caps of automobile radiators. In my Patent, No. 1,090,776, I have disclosed an invention relating to the indication of the thermal condition of internal combustion engines, and as a particular application thereof I show in that patent a thermometer mounted upon the filler cap of an automobile radiator.

The present invention relates to an improved method of mounting the thermometer on the radiator cap or connection therewith, so as to make the same applicable to caps of a particular type and also to make parts of the instrument, or of a member attached thereto, serve also as the means for securing the cap in its position on the radiator filler spout.

The nature and more specific objects of the invention will more clearly appear from the following detailed description of certain embodiments thereof.

In the accompanying drawings which form a part of this specification;

Figure 1 is a vertical sectional view through the upper part of the radiator, filler spout and cap, the instrument being shown in elevation.

Figure 2 is a vertical sectional view on line II—II of Figure 1.

Figure 3 is a sectional view on lines III—III of Figure 1.

Figure 4 is a fragmentary sectional view similar to Figure 2 of a modified construction.

Referring to the drawings in detail, the numeral 1 designates the upper part of the radiator, provided with the filler spout 2 which in the present instance is represented as oval. Near the lower end of the filler spout is fixed a frame 3, having large openings 4 therethrough to permit the water to be poured into the radiator and having a center cross-piece or bridge 5, which has a central screw threaded opening 6. 7 is the filler cap, which in the construction shown is a compound member, comprising an outer shell 8 and metal plates 9 and 10 between which is clamped by means of screws 11, a layer of cork, rubber or other suitable yielding material 12. The plate 10 is smaller than the plate 9 and the cork or rubber, so as to leave the margin of the latter exposed. In this way, a yielding packing is provided which fits against the upper edge of the filler spout and makes tight connection when the cover is clamped to the spout. The cover is provided with an opening 13 in alignment with the opening 6 of the bridge. 14 is the instrument which, as illustrated, comprises a metal frame 15, having a base 16 and a downwardly projecting hollow stem 17, terminating in a screw threaded nipple 18. Openings 19 are provided in the stem to place the interior thereof in connection with the space within the radiator. The frame of the instrument has a vertical opening 20 therethrough which forms a continuation of the opening in the hollow stem, and which preferably extends to the top of the frame, being closed at that point by a plug 21. A glass tube thermometer 22 is inserted in this opening and is held at its lower end by suitable cement, the plug 21 then being inserted to close the opening. The bulb 24 is arranged adjacent to the openings 19, so as to be influenced by the temperature within the radiator. The upper part of the thermometer tube is preferably enclosed between the crystals 25, a suitable dial plate 26 being provided on one side of the thermometer. The construction of the visible part of the instrument may be of any suitable character, that described being substantially the same as that illustrated in my patent above referred to, except as to the continuation of the opening 20 to the top of the instrument and the use of the plug 21. This opening permits the thermometer tube to be inserted from the top instead of from the bottom as in the prior construction. The base 16 of the instrument is preferably provided with a recess 27 in which may be placed a spring or yielding washer 28. If desired the instrument and filler cap may be held together by suitable means such as the screw 29, the instrument being free to be turned with relation to the cap. In using the device described, it will be seen that the radiator filler cap with the instrument thereon is simply placed on the top of the filler neck, and the threaded nipple 18 screwed into the threaded opening in the bridge by rotating the instrument. The nipple is screwed down sufficiently to cause the base of the instrument to clamp the cap firmly to the filler neck, the yielding member 12 forming a tight joint. The yielding member 12 also provides sufficient latitude in screwing down the instrument to enable the latter to be brought to such a final position that its face shall be correctly set with relation to the axis of the car, as the instrument may be turned more or less to bring it to its final position without permitting looseness between the instrument, cap and filler spout. The yielding washer 28 also assists in this result, as well as acting to prevent the accidental unscrewing of the instrument. Thus it will be seen that an exceedingly simple and effective construction is provided, in which the instrument is made to act as the cap securing means.

In Figure 4, I have shown a modified construction in which the instrument, the base of which is shown at 16, instead of being provided with a stem which directly engages with the bridge, has a short screw threaded stem 30 similar to that illustrated in my patent above referred to, which is screwed into a hollow hand screw or holder 31. The latter is provided with suitable means such as the finger knobs 32, by which it may be rotated, and with the stem 33, having the holes 34 therein, and which is formed at its lower end with the screw threaded nipple 35. This device operates in a way similar to that previously described, except that the instrument is separate from the part which engages the cap and bridge and the latter part is provided with finger engaging means by which it may be rotated to clamp the cap to the filler spout.

While I have illustrated and described in detail certain preferred embodiments of my invention, it will be understood that modifications may be made therein without departing from the spirit and scope of my invention.

Having thus described my invention, I claim:

1. The combination with an automobile radiator provided with a filler spout having a part fixed with relation thereto, of a cap for closing said spout, and a temperature indicating instrument mounted on said cap and having a part including the temperature responsive element of the instrument extending into said spout and adapted to be brought into locking engagement with said fixed part thereof for fastening said cap to said spout.

2. The combination with an automobile radiator provided with a filler spout having a part fixed with relation thereto, of a cap for closing said spout and having a hole therethrough, and a temperature indicating instrument mounted on said cap and having a stem projecting through said hole and engaging with said fixed part for fastening said cap to said spout, said stem being hollow and receiving the temperature responsive means of said instrument.

3. The combination with an automobile radiator, having a filler spout of substantially elliptical cross section, and having a fixed bridge extending across said spout, said bridge having a screw threaded hole therein, of an elliptically shaped cap adapted to fit on the outer end of said spout, and having a hole therethrough of larger diameter than the screw threaded hole in said bridge but located directly over said last named hole, and a temperature indicating instrument mounted on said cap and having a hollow stem extending through the hole in the cap and screwing into the screw threaded opening in said bridge, said indicating instrument having indicating means located in the part thereof above said cap and having a temperature responsive element for controlling the action of said indicating means located in said hollow stem portion where it will be subjected to temperatures within the radiator below said cap.

4. The combination with an automobile radiator, having a filler spout, and a fixed bridge member in said spout, having a screw threaded opening therein, of a non-rotatable cap adapted to close the top of said spout, means providing a yielding packing between said cap and the edge of said spout, and a temperature indicating instrument rotatably mounted on said cap and having a screw threaded stem extending below said cap and adapted to be screwed into the screw threaded opening in said bridge by the rotation of said instrument upon said cap.

5. The combination with an automobile radiator having a filler spout and a bridge fixed in the lower part of said spout of a cap adapted to close said spout, said cap comprising an outer rigid shell and a yielding packing member therein adapted to rest on the upper edge of the filler spout, said cap having a hole therethrough, and an indicating instrument adapted to rest on top of the outer shell of said cap and having a stem projecting through the hole in said cap, said stem being threaded and screwing into a screw threaded opening in said bridge.

6. An instrument of the character described, comprising a frame having a vertical opening therethrough closed at the upper end by a plug and having a downwardly projecting hollow stem closed at the lower end and with transverse openings through the wall thereof, said frame being formed with a supporting shoulder above said stem and a thermometer tube mounted in said vertical opening and having its bulb located adjacent to said transverse openings, the frame above said shoulder being formed with an open front to permit observation of said thermometer.

7. An instrument of the character described comprising an open frame having a dial therein and a base providing a supporting shoulder, said frame and base being perforated to receive a thermometer extending across the frame, the base having projecting below it a hollow tubular extension to receive the bulb of the thermometer, the side walls of the extension being perforated, the extension below the perforated part being reduced in diameter and externally screw-threaded, and removable means carried by the upper part of said extension forming a stop or abutment adapted to cooperate with said shoulder to secure a radiator cap to the instrument against longitudinal movement but not against rotary movement.

8. In an apparatus of the character described, the combination of a frame having a supporting shoulder thereon and a tubular extension depending below said shoulder and terminating in a screw-threaded nipple, said frame carrying a thermometer, the tube portion of which extends across said frame, the bulb of said thermometer extending into said tubular extension, and a perforated radiator filler spout cap mounted on said extension against said shoulder and free to rotate with relation to said extension and means for securing said cap upon said extension against longitudinal movement with relation thereto.

9. In an apparatus of the character described, the combination of a frame having a supporting shoulder thereon and a tubular extension depending below said shoulder, said frame carrying a thermometer, the tube portion of which extends across the same, the bulb of said thermometer extending into said tubular extension, and a perforated radiator filler spout cap mounted on said extension against said shoulder and free to rotate with relation to said extension, and means for securing said cap upon said extension against longitudinal movement with relation thereto, said cap comprising an outer rigid shell having a downwardly turned flange, a yielding packing member in said shell and a retaining plate for said packing member of slightly smaller dimensions than said member so as to leave the margin thereof exposed.

10. The combination with an automobile radiator having a filler spout and a frame fixed within said spout, said frame having an opening to permit the passage of water therethrough and a screw threaded opening, of a cap adapted to close said spout, and an indicating instrument rotatably mounted upon said cap and having a screw-threaded portion extending below said cap and adapted to be screwed into the screw threaded opening in said frame to fasten the cap to said spout.

HARRISON H. BOYCE.